(12) United States Patent
Posthumus

(10) Patent No.: US 8,424,476 B2
(45) Date of Patent: Apr. 23, 2013

(54) COMBINATION BOAT AND TRAVEL TRAILER SYSTEM

(76) Inventor: Albert Posthumus, Stephenville, TX (US)

( * ) Notice: Subject to any disclaimer, the term of this patent is extended or adjusted under 35 U.S.C. 154(b) by 77 days.

(21) Appl. No.: 12/907,709

(22) Filed: Oct. 19, 2010

(65) Prior Publication Data

US 2012/0090526 A1   Apr. 19, 2012

(51) Int. Cl.
*B63B 43/10* (2006.01)
(52) U.S. Cl.
USPC .................................. 114/69; 114/344
(58) Field of Classification Search ............ 114/344, 114/352, 68, 69
See application file for complete search history.

(56) References Cited

U.S. PATENT DOCUMENTS

| | | |
|---|---|---|
| 3,134,991 A | 6/1964 | Levinson |
| 3,158,881 A | 12/1964 | Clausen |
| 3,193,851 A | 7/1965 | Fiebelkorn |
| 3,203,014 A | 8/1965 | Krueger |
| 3,289,225 A | 12/1966 | Isch et al. |
| 3,300,796 A | 1/1967 | Powers |
| 3,344,448 A | 10/1967 | Goetz |
| 3,436,773 A | 4/1969 | Richardson |
| 3,537,117 A | 11/1970 | Plesnevich |
| 3,599,256 A | 8/1971 | Carroll, Jr. |
| 3,628,203 A | 12/1971 | Nohse |
| 3,673,622 A | 7/1972 | Allen |
| 3,689,950 A | 9/1972 | Jalowiecki et al. |
| 3,744,070 A | 7/1973 | Shaw |
| 3,755,838 A | 9/1973 | Dunagan |
| 3,763,511 A | 10/1973 | Sisil |
| 3,787,910 A | 1/1974 | Taylor |
| 3,877,094 A | 4/1975 | Kelley |
| D268,101 S | 3/1983 | Pope et al. |
| 4,515,102 A | 5/1985 | Kury |
| 4,611,820 A | 9/1986 | Massey, Sr. et al. |
| 4,955,834 A | 9/1990 | Henderson et al. |
| 4,981,100 A * | 1/1991 | Bergeron ............... 114/344 |
| 5,072,963 A | 12/1991 | Avillez de Basto |
| 5,113,779 A * | 5/1992 | Amrein et al. .......... 440/12.63 |
| 5,135,325 A * | 8/1992 | Eddy ..................... 405/66 |
| 5,243,924 A | 9/1993 | Mann |
| 5,505,514 A | 4/1996 | Green |
| 5,607,330 A | 3/1997 | Hanz |
| 6,029,598 A | 2/2000 | Stoll |
| RE36,901 E * | 10/2000 | Roycroft et al. ........ 440/12.52 |
| 6,446,569 B1 | 9/2002 | Pitts |
| 6,526,900 B2 * | 3/2003 | Redman ................. 114/68 |
| 6,725,796 B2 | 4/2004 | Mensch |
| 6,988,456 B1 | 1/2006 | Schooler |
| 7,900,574 B2 * | 3/2011 | Henricson ............... 114/353 |
| 2002/0134295 A1 | 9/2002 | Chimato |
| 2008/0047481 A1 | 2/2008 | Maarschalkerweerd et al. |

FOREIGN PATENT DOCUMENTS

WO   WO 2008018829   * 2/2008

* cited by examiner

*Primary Examiner* — Stephen Avila
(74) *Attorney, Agent, or Firm* — Gardere Wynne Sewell LLP

(57) ABSTRACT

A combination boat and travel trailer system having a main body portion and a bow portion. The bow portion movable between a raised position relative to the main body portion to facilitate towing of the boat and travel trailer and a lowered position to facilitate in-water use as a boat.

15 Claims, 4 Drawing Sheets

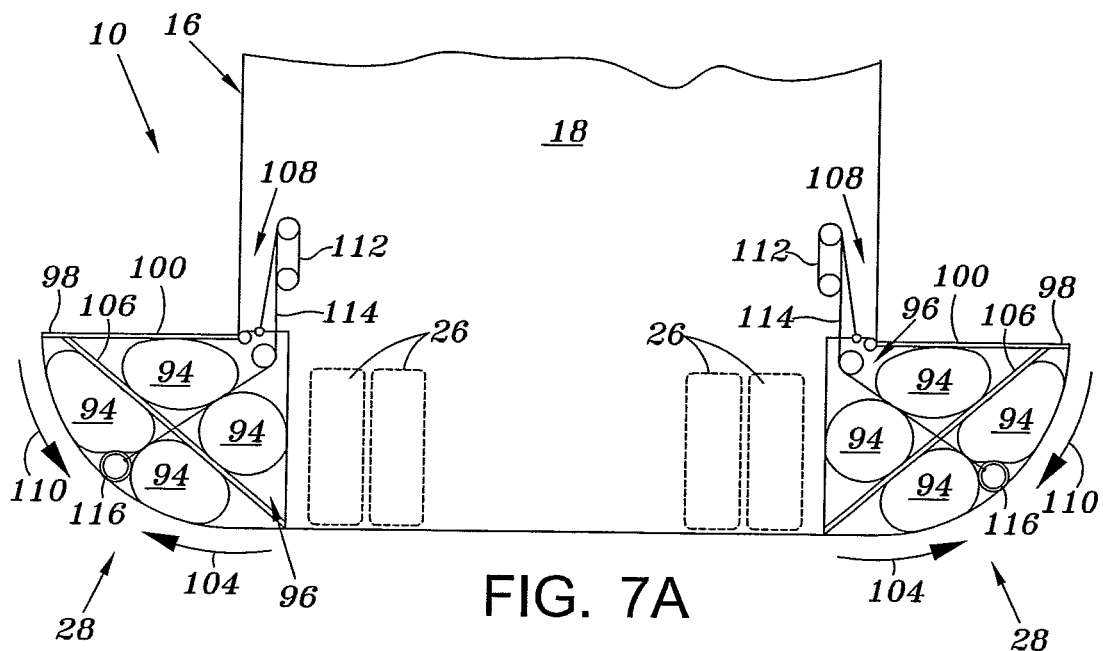
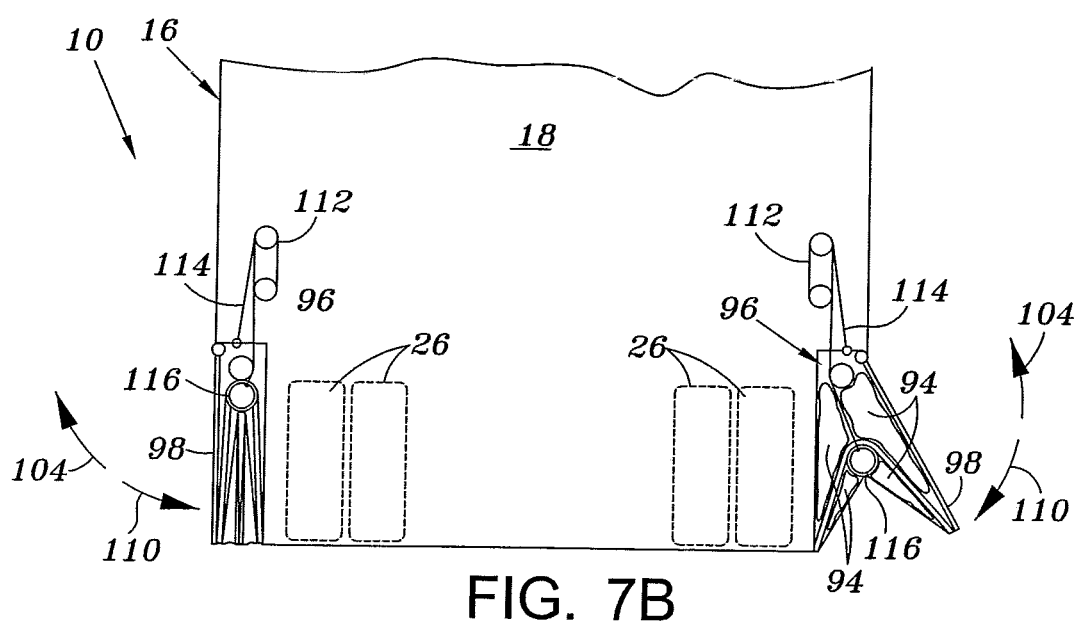

COMBINATION BOAT AND TRAVEL TRAILER SYSTEM

BACKGROUND

Enjoying outdoor activities can be achieved in many ways. For example, camping can be done with tents around a campsite or with campers that either are vehicles, such as RVs, or are trailer campers that are trailed to the campsite via a vehicle having the trailer hitched to the vehicle. Oftentimes, persons desire to travel with boats for use on area nearby lakes, rivers, and other accessible bodies of water. However, unless the boat is inflatable, collapsible, or otherwise capable of being contained in or mounted onto a vehicle used to travel to a campsite, the boat must be mounted on a trailer that is hitched to a vehicle for transportation to the campsite and eventually, transported to the lake for launching the boat. For persons who travel with such boats to a campsite, not only must they have a boat, but must also use a trailer to transport the boat. For persons utilizing a trailer camper, traveling with multiple trailers can be particularly cumbersome and/or problematic. Therefore, it is desirable to provide a boat and travel trailer system that combines the boat function with a camper and vehicle function.

BRIEF DESCRIPTION OF THE DRAWINGS

FIG. 7A is an end view of the boat and travel system of FIGS. 1-6 in which the rear wheels are retracted within the boat and travel trailer system and the flotation system is configured for use; and FIG. 7B illustrates the boat stabilization system, the right side partially transitioning to the stored position and the left side configured in the stored position.

DETAILED DESCRIPTION

Figure 1:
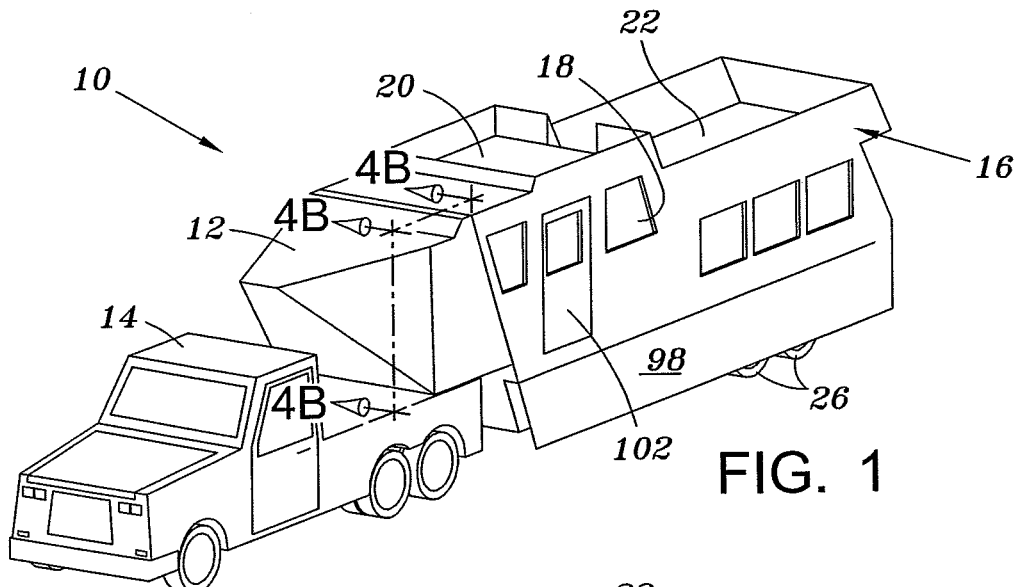
FIG. 1 is a diagram of a combination boat and travel trailer system attached to a vehicle for towing thereof.

In the description which follows, like parts are marked throughout the specification and drawings with the same reference numerals, respectively. The drawings may not be to scale and certain features may be shown exaggerated in scale or in somewhat schematic form in the interest of clarity and conciseness.

Figure 2:
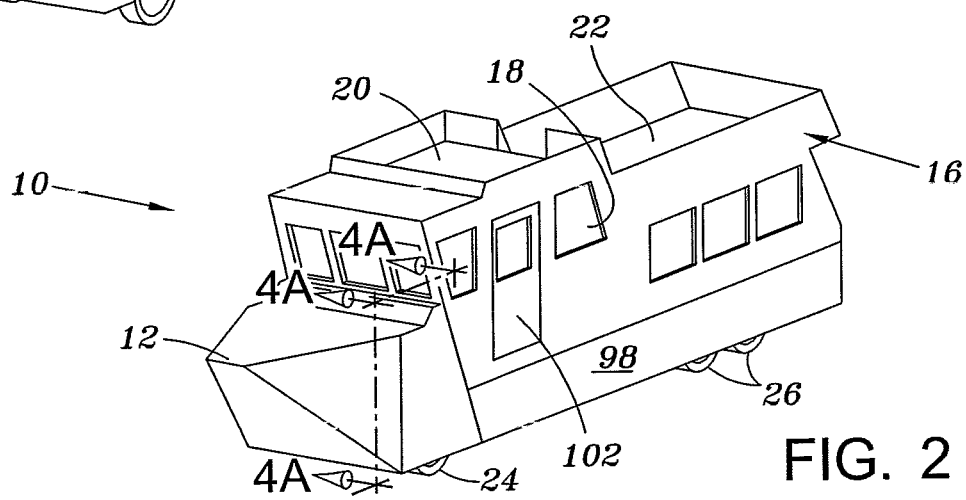
FIG. 2 is a diagram of the boat and travel trailer system of FIG. 1 detached from the vehicle and illustrating the bow in a lower position and configured for movement over land.
Figure 3:
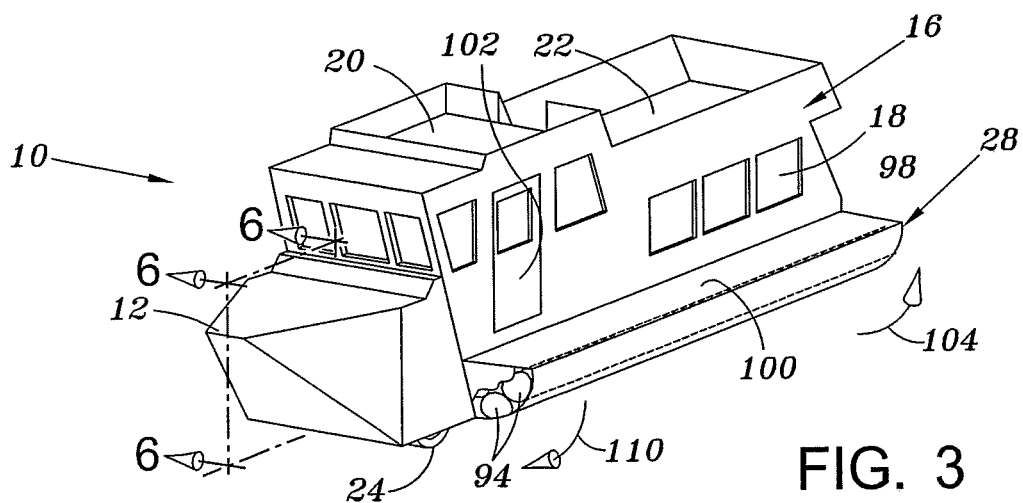
FIG. 3 is a diagram of the boat and travel trailer system of FIG. 2 illustrating the bow in the lower position and configured for movement in water.

FIGS. 1-3 are diagrams of a combination boat and travel trailer system 10 in which a bow 12 is movable or otherwise adjustable between an upper position, to enable towing by a vehicle 14, and a lower position, to facilitate use as a boat and/or to facilitate movement of system 10 as a terrestrial vehicle. In the embodiment illustrated in FIGS. 1-3, movable bow 12 is connected to and positionable relative to a main body or cabin section 16 having living quarters 18 and one or more decks 20 and 22. It should be understood that boat and travel trailer system 10 may be otherwise configured, such as, for example, without having living quarters, having a larger living quarter area or any other desired configuration.

Referring specifically to FIG. 1, bow 12 is configured in the upper or towing position so as to be connectable to vehicle 14 for towing when on land. In FIG. 2, boat and travel trailer system 10 is detached from vehicle 14 with bow 12 in the lowered or boating position to enable movement of boat and travel system 10 on water or on land without the need for towing vehicle 14. For example, system 10 includes forward wheels 24 and rear wheels 26 to enable boat and travel trailer system 10 to be driven as a terrestrial vehicle. Preferably, vehicle 14 can pull or otherwise tow boat and travel trailer system 10 to desired locations and then be detached therefrom. Once detached, bow 12 is positioned to the lowered position (FIG. 2) to enable boat and travel trailer system 10 to be driven into a body of water for use as a boat. During in-water use, wheels 24 and/or 26 can be retracted and a flotation system 28 (FIG. 3), as discussed in further detail below, is activated to stabilize boat and travel trailer system 10.

Figure 4A:
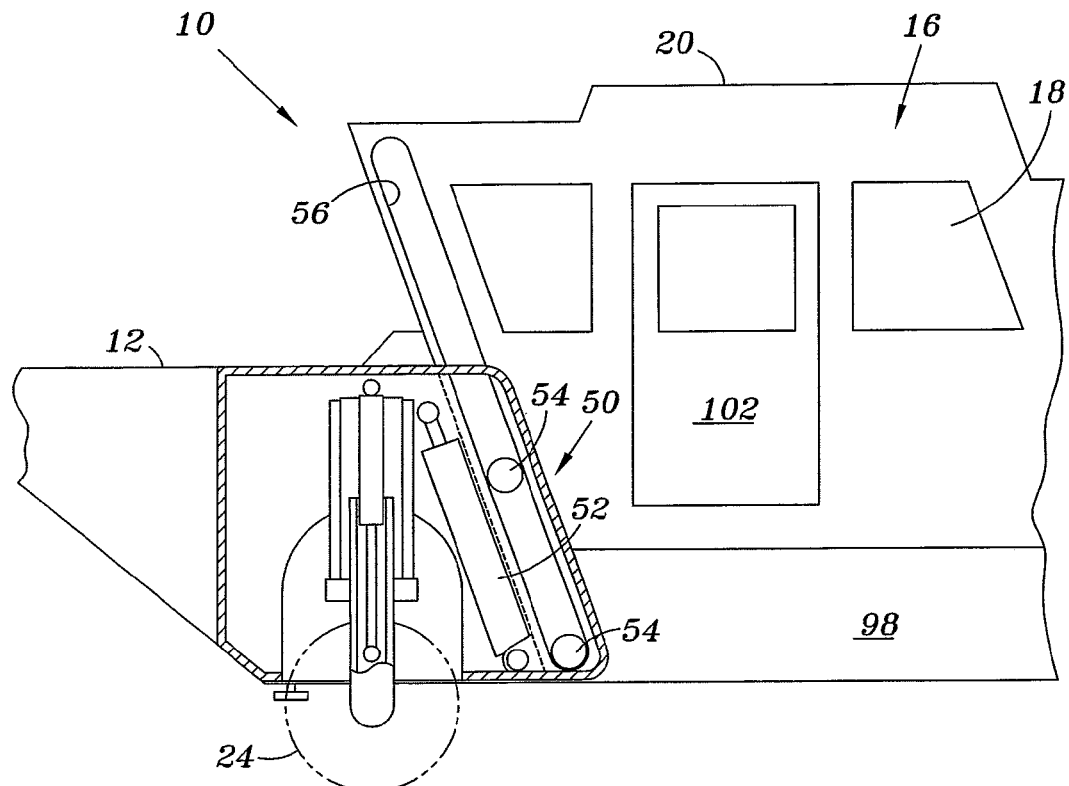
FIG. 4A is a section view of a portion of the boat and travel trailer system of FIG. 2 taken along the line 4A-4A.
Figure 4B:
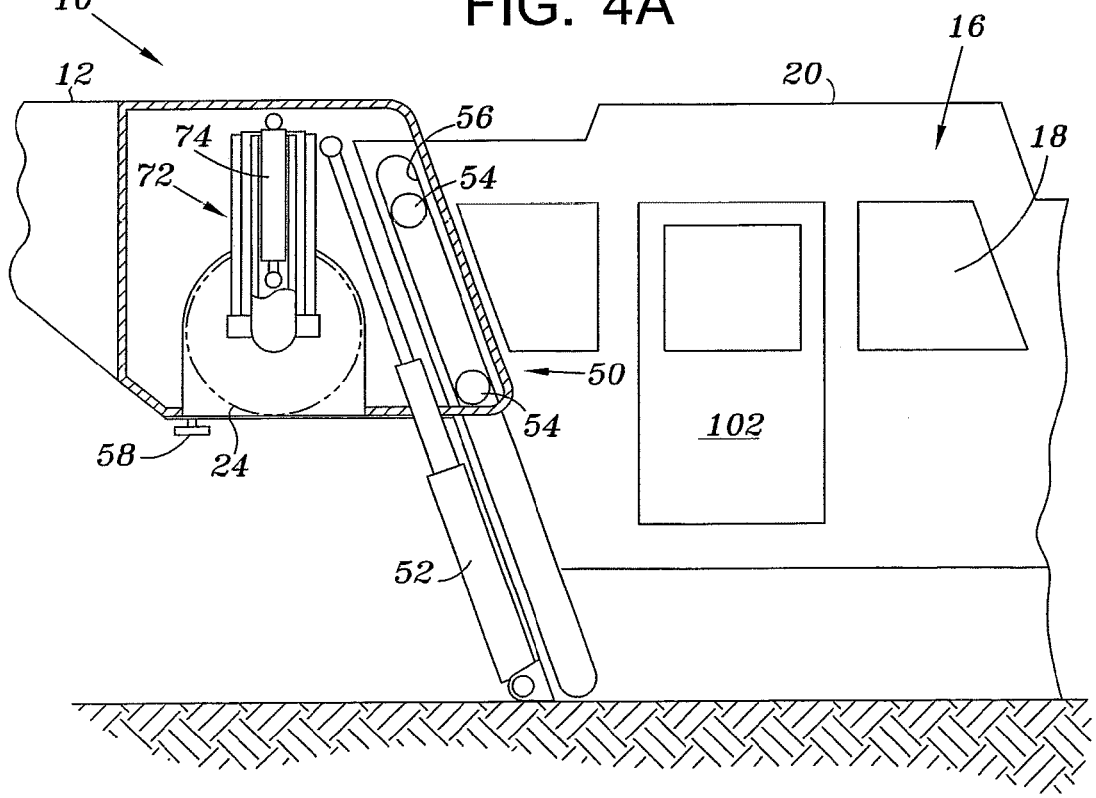
FIG. 4B is a section view of a portion of the boat and travel trailer system of FIG. 1 taken along the line 4B-4B.

FIGS. 4A and 4B illustrate bow positioning system 50 for positioning bow 12 between the upper and lower positions. In the embodiment illustrated in FIGS. 4A and 4B, bow positioning system 50 comprises a hydraulic cylinder 52 to provide a lifting force to raise bow 12 relative to main body 16. In operation, as cylinder 52 raises bow 12, bow 12 is guided upward by a rack and pinion system 54 disposed within a generally vertical slot 56 to guide bow 12 to the raised position. Once bow 12 is in the raised position, a connection member 58, such as, for example, a trailer hitch, can be used to enable boat and travel trailer system 10 to be connected to vehicle 14 for transport, as illustrated in FIG. 1.

Figure 5:
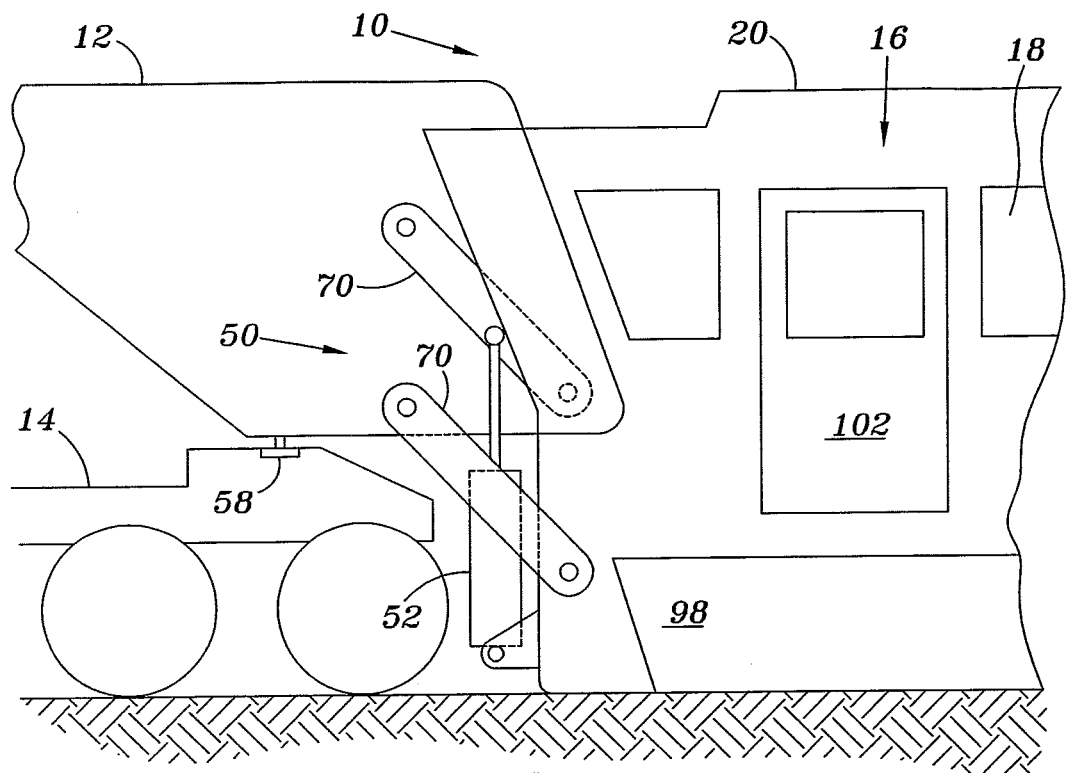
FIG. 5 is a diagram of an alternate embodiment of the boat and travel trailer system of FIGS. 1-4.

FIG. 5 is an illustration of an alternate configuration of bow positioning system 50. In the embodiment illustrated in FIG. 5, bow 12 is connected to main body 16 via pivotable arms 70. In operation, hydraulic cylinder 52 and pivotable arms 70 are operable to position bow 12 between the upper and lower positions. Accordingly, in operation, hydraulic cylinder 52 lifts bow 12 and arms 70 are thus operable to pivotably guide bow 12 upward until reaching the upper position, as illustrated in FIG. 5.

In the embodiment illustrated in FIG. 5, bow 12 is positioned in the upper position such that the top surface of bow 12 extends upward and higher than the top surface of main body 16. Accordingly, as wheels 24 and 26 are retracted and the bottom surface of main body 16 rests directly on the ground, connection member 58 can be detached from vehicle 14 so as to enable vehicle to travel without pulling main body 16. In addition, the ability for main body 16 to rest directly on the ground facilities stability of the main body 16 while also enabling easy access into living quarters 18.

Referring back to FIGS. 4A and 4B, wheels 24 are positionable between an extended position (FIG. 4A) and a retracted position (FIG. 4B) via retraction system 72. Preferably, wheel retraction system 72 comprises a hydraulic cylinder 74 configured to extend wheels 24 from within a wheel well 76 when it is desired to support or otherwise move/transport boat and travel trailer system 10 on land. It should be further understood that wheels 26 (FIGS. 1 and 2) are also positionable via an identical or otherwise substantially similar retraction system 72.

Figure 6:
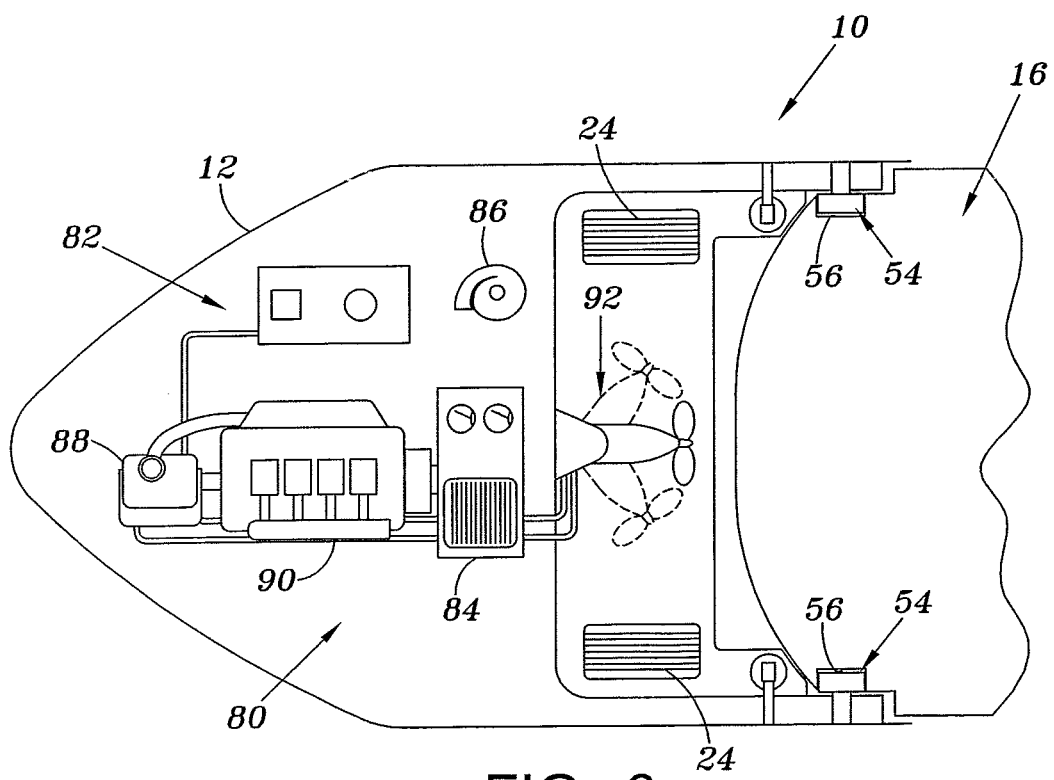
FIG. 6 section view taken along the line 6-6 of FIG. 3.

Referring now to FIG. 6, a storage area 80 of bow 12 is sized to store or otherwise receive various operational components 82 of boat and travel trailer system 10. For example, storage area 80 is sized to receive a power generator 84, an air pump 86, and oil pump 88 and an engine 90, all of which are used to operate boat and travel trailer system 10. For example, engine 90 is configured to provide sufficient power to enable boat and travel trailer system 10 to move on land and/or to provide power to operate a propeller 92 to facilitate operation of boat and travel trailer system 10 on water. It should be understood that while storage area 80 is configured to receive operational components 82 therein, it should be understood that operational components 82 may be otherwise positioned or mounted within boat and travel trailer system 10. For example, engine 90 and propeller 92 may be positioned toward the middle or rear area of boat and travel trailer system 10.

Referring now to FIGS. 3 and 7A and 7B, flotation system 28 is illustrated. Flotation system 28 includes a plurality of inflatable air storage devices 94 storable within a recessed or storage area 96. In the illustrated embodiment, air storage devices 94 each are formed an inflatable nylon or canvas bag. Referring specifically to FIGS. 7A and 7B, boat and travel trailer system 10 contains a recessed area 96a and 96b on each side of boat and travel trailer system 10 to provide stabilization to main body 16 when floating on water. Preferably, each recessed area 96 is enclosed by a fender 98 that is pivotable from the closed position (FIG. 7B), to enclose or otherwise protect air storage devices 94 when not in use, to the open position (FIG. 7A), when it is desired to stabilize boat and travel trailer system 10 when on water. In addition, fenders 98, when pivoted to the open position, provide a walking surface 100 to allow passengers to walk around living quarters 18 when on the water. Furthermore, when boat and travel trailer system 10 is on land, walking surface 100 can be utilized as a step or walking surface to provide access to living quarters 18 via entranceway door 102.

In operation, when it is desired to utilize flotation system 28, air pump 84 is activated to inflate air storage devices 94. As air storage devices 94 inflate, fenders 98 are pushed from the closed position (to enclose recessed area 96) and rotated in the direction of arrow 104. Fenders 98 continue to rotate in response to the inflation of storage devices 94 until a stop cord 106 is fully extended, which prevents further rotation of fender 98 (the open position). Once air storage devices 94 are fully inflated, fender 98 is disposed in the generally horizontal configuration relative to main body 16 to create walking surface 100 around living quarters 18.

In the embodiment illustrated in FIG. 7A, each flotation system 28 contains four air storage devices 94 on each side of main body 16 so as to provide additional stabilization to boat and travel trailer system 10 when on the water; however, it should be understood that a greater or fewer number of air storage devices 94 can be utilized. Each storage device 94 is deflatable and storable within recessed area 96 when not in use.

When storing flotation system 28, a retraction system 108 is used to deflate air storage devices 94 and rotate fender 98 in the direction of arrow 110 to enclose recessed area 96. Retraction system 108 includes a winch 112 for winding a retraction cord 114. In operation, as winch 112 retracts cord 114, a pipe or rod 116, disposed on the opposite end of cord 114 from winch 112, is retracted inside recessed area 96. During retraction, pipe 116 gathers air storage devices 94 and provides sufficient force on air storage devices 94 to force or otherwise drain air from within the storage devices 94. During movement, pipe 116 contacts a stop cord 106, which pulls and/or otherwise causes fender 98 to pivot in the direction of arrow 110 until it is in the closed position to thereby enclose recessed area 96 (FIG. 7B).

It should also be understood that bow 12 is positionable upwardly and downwardly, as described above, such that when in water, bow 12 can be used to trim boat and travel trailer system 10. According to some embodiments, bow 12 can be lowered to a level below the bottom of main body 16 (not illustrated), if necessary, to trim the boat and travel trailer system 10.

Although specific embodiments have been described in detail, those skilled in the art will also recognize that various substitutions and modifications may be made without departing from the scope and spirit of the appended claims.

What is claimed is:

1. A combination boat and travel trailer system, comprising:
   a main body portion having a face on a lateral end thereof; and
   a bow portion movably connected to the main body portion, the bow portion having a face on a lateral end thereof, the bow portion having a trailer hitch extending from a bottom wall of the bow portion, the bow portion movable between a lowered position, to facilitate use of the boat and travel trailer system as a boat or a terrestrial vehicle, and a raised position, to enable connection of the trailer hitch to a terrestrial vehicle to facilitate pulling of the boat and travel trailer by the terrestrial vehicle, wherein the face of the main body portion faces the face of the bow portion when the bow portion is in both the lowered position and the raised position, and wherein the bow portion is movably connected to the main body portion such that the bow portion protrudes laterally from the face of the body portion when the bow portion is in both the lowered position and the raised position.

2. The system of claim 1, wherein the bow is slideably positionable relative to the main body portion between the raised and lowered positions.

3. The system of claim 2, further comprising a hydraulic positioning system to position the bow between the raised and lowered positions.

4. The system of claim 1, wherein the bow is pivotably connected to the main body portion.

5. The system of claim 1, wherein the bow is pivotably connected to the body portion by a pair of rigid arms.

6. The system of claim 1, wherein the main body further comprises front wheels and rear wheels to facilitate movement of the system while on land.

7. The system of claim 6, wherein the front and rear wheels are retractable within the main body.

8. The system of claim 1, further comprising a flotation system storable within a recessed area of the main body when in a stored position and operable to position from within the recessed portion to stabilize the main body.

9. The system of claim 4, further comprising a fender to enclose the recessed portion, the fender movable from a closed position, to enclose the recessed portion, and an open position, to facilitate use of the flotation device.

10. A boat flotation system, comprising:
    storage area;
    an inflatable air storage device disposed within the storage area when in the stored position, and extendable from the storage area to the use position in response to inflating the air storage device, wherein the air storage device comprises four inflatable bags, a fender and a stop cord, wherein the fender is rotatably connected to a portion of the storage area and covers the storage area when the inflatable air storage device is disposed in the stored position, wherein the stop cord is attached at one end to a distal end of the fender opposite the rotatable connection to the storage area and is attached at an opposite end to a portion of the storage area, wherein the stop cord is of a length to prevent the fender from rotating more than about 90 degrees from the stored position, and wherein the stop cord is positioned between a first set of two inflatable bags and a second set of two inflatable bags; and a retraction system for deflating the air storage device and positioning the flotation member from the use position to the stored position, the retraction system comprising a cord extending between a winch on a first end of the cord and a rod on the second and opposite end of the cord, the winch configured for winding the cord and moving the rod to compress the inflatable storage device to force air from within and deflate the air storage device and position the air storage device within the storage area.

11. The system of claim 10, wherein at least one of the four inflatable bags is a nylon bag.

12. The system of claim 10, wherein the fender encloses the storage area and is pivotable between a closed position, to enclose the storage area, and a open position, to provide a walking surface.

13. The system of claim 12, wherein the fender is secured in the open position by the stop cable.

14. The apparatus of claim 1, wherein the main body portion further comprises:

storage area;

an inflatable air storage device disposed within the storage area when in the stored position, and extendable from the storage area to the use position in response to inflating the air storage device, wherein the air storage device comprises four inflatable bags, a fender and a stop cord, wherein the fender is rotatably connected to a portion of the storage area and covers the storage area when the inflatable air storage device is disposed in the stored position, wherein the stop cord is attached at one end to a distal end of the fender opposite the rotatable connection to the storage area and is attached at an opposite end to a portion of the storage area, wherein the stop cord is of a length to prevent the fender from rotating more than about 90 degrees from the stored position, and wherein the stop cord is positioned between a first set of two inflatable bags and a second set of two inflatable bags; and a retraction system for deflating the air storage device and positioning the flotation member from the use position to the stored position, the retraction system comprising a cord extending between a winch on a first end of the cord and a rod on the second and opposite end of the cord, the winch configured for winding the cord and moving the rod to compress the inflatable storage device to force air from within and deflate the air storage device and position the air storage device within the storage area, wherein the cord is positioned between a first and a second inflatable bag of the first set of inflatable bags and between a first and a second inflatable bag of the second set of inflatable bags.

15. The system of claim 10, wherein the cord is positioned between a first and second inflatable bag of the first set of inflatable bags and between a first and second inflatable bag of the second set of inflatable bags.

* * * * *